United States Patent
Hibino (10) Patent No.: US 9,358,920 B2
(45) Date of Patent: Jun. 7, 2016

(54) VEHICULAR LIGHTING APPARATUS

(71) Applicant: DENSO CORPORATION, Kariya, Aichi-pref. (JP)

(72) Inventor: Katsuhiko Hibino, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/386,251

(22) PCT Filed: Mar. 22, 2013

(86) PCT No.: PCT/JP2013/058269
§ 371 (c)(1),
(2) Date: Sep. 18, 2014

(87) PCT Pub. No.: WO2013/141353
PCT Pub. Date: Sep. 26, 2013

(65) Prior Publication Data
US 2015/0042226 A1    Feb. 12, 2015

(30) Foreign Application Priority Data

Mar. 22, 2012  (JP) .................................. 2012-065711
Feb. 18, 2013  (JP) .................................. 2013-029269

(51) Int. Cl.
*B60Q 1/02*  (2006.01)
*B60Q 1/14*  (2006.01)
*B60Q 1/08*  (2006.01)

(52) U.S. Cl.
CPC .............. *B60Q 1/1423* (2013.01); *B60Q 1/085* (2013.01); *B60Q 1/143* (2013.01); *B60Q 2300/056* (2013.01); *B60Q 2300/41* (2013.01); *B60Q 2400/30* (2013.01)

(58) Field of Classification Search
CPC .... H05B 33/083; B60Q 1/0023; B60Q 9/008; B60Q 1/02; B60Q 1/06; B60Q 1/14; B60Q 1/26
USPC ........ 315/76, 77, 82; 307/10.1, 10.8; 362/466
See application file for complete search history.

(56) References Cited

U.S. PATENT DOCUMENTS 1,983,882 A * 12/1934 Rosenfeld .............. B60Q 9/008
                                                              188/110
2,380,486 A *  7/1945 Willis, Jr. ............. B60Q 1/0023
                                                              250/214 R (Continued)

FOREIGN PATENT DOCUMENTS

EP       2 100 771      9/2009
JP       S62253544 A    11/1987

(Continued)

OTHER PUBLICATIONS

International Search Report (in Japanese with English Translation) for PCT/JP2013/058269, mailed May 21, 2013; ISA/JP.

(Continued)

*Primary Examiner* — Tung X Le
(74) *Attorney, Agent, or Firm* — Harness, Dickey & Pierce, P.L.C.

(57) ABSTRACT

A vehicular lighting apparatus includes a front detection sensor, a driving support ECU, a headlight ECU, a leveling motor and a headlight. When a subject vehicle is determined as being in an automatic following state with respect to a forward vehicle or a vehicle-to-vehicle distance between the subject vehicle and the forward vehicle is determined by a vehicle-to-vehicle distance determining portion as being short, the vehicular lighting apparatus changes. If a high-beam lamp or a low-beam lamp is illuminating, the illumination state changes such that the low-beam lamp illuminates more downward than normal. Consequently, it becomes possible to lower the degree of dazzling an occupant of the forward vehicle. Moreover, if a daytime running lamp is illuminating, the vehicular lighting apparatus turns the daytime running lamp off. Consequently, it becomes possible to lower a battery load of the subject vehicle.

15 Claims, 4 Drawing Sheets

(56) References Cited

U.S. PATENT DOCUMENTS

| | | | | |
|---|---|---|---|---|
| 2,699,834 | A * | 1/1955 | O'Brien | B60Q 9/008 180/169 |
| 3,749,197 | A * | 7/1973 | Deutsch | B60K 31/0008 180/169 |
| 4,491,840 | A * | 1/1985 | Nishikawa | B60Q 9/008 180/169 |
| 4,620,267 | A * | 10/1986 | Cibie | B60Q 1/0023 362/466 |
| 5,805,527 | A * | 9/1998 | Hoashi | G01S 7/487 367/98 |
| 6,144,159 | A * | 11/2000 | Lopez | B60Q 1/0023 315/82 |
| 6,265,990 | B1 * | 7/2001 | Isogai | B60K 31/0008 340/435 |
| 6,317,073 | B1 * | 11/2001 | Tamatsu | G01S 7/352 342/109 |
| 6,343,869 | B1 * | 2/2002 | Kobayashi | B60Q 1/085 315/77 |
| 6,356,189 | B1 | 3/2002 | Fujimaki | |
| 6,906,467 | B2 * | 6/2005 | Stam | B60Q 1/085 250/208.1 |
| 2001/0024171 | A1 * | 9/2001 | Nishimura | B60Q 1/0023 342/70 |
| 2002/0121398 | A1 | 9/2002 | Kikuchi et al. | |
| 2004/0210369 | A1 * | 10/2004 | Mizuno | B60Q 1/12 701/49 |
| 2005/0195074 | A1 | 9/2005 | Kano | |
| 2005/0253738 | A1 * | 11/2005 | Kobayashi | B60Q 1/085 340/988 |
| 2007/0086203 | A1 * | 4/2007 | Nakano | B60Q 1/0023 362/514 |
| 2008/0030374 | A1 * | 2/2008 | Kumon | B60Q 1/143 340/937 |
| 2008/0103661 | A1 * | 5/2008 | Sugimoto | B60Q 1/122 701/49 |

FOREIGN PATENT DOCUMENTS

| | | |
|---|---|---|
| JP | 2000293799 A | 10/2000 |
| JP | 2002178786 A | 6/2002 |
| JP | 2003276502 A | 10/2003 |
| JP | 2005199794 A | 7/2005 |
| JP | 2009220636 A | 10/2009 |
| JP | 2011249183 A | 12/2011 |

OTHER PUBLICATIONS

Written Opinion for PCT/JP2013/058269, mailed May 21, 2013; ISA/JP.

Office Action dated Oct. 28, 2015 in corresponding Chinese Application No. 201380015787.2 (with English translation).

International Preliminary Report on Patentability in corresponding PCT Application No. PCT/JP2013/058269.

* cited by examiner

VEHICULAR LIGHTING APPARATUS

CROSS REFERENCE TO RELATED APPLICATIONS

This application is a U.S. National Phase Application under 35 U.S.C. 371 of International Application No. PCT/JP2013/058269 filed on Mar. 22, 2013 and published in Japanese as WO 2013/141353 A1 on Sep. 26, 2013. This application is based on and claims the benefit of priority from Japanese Patent Applications No. 2012-065711 filed on Mar. 22, 2012, and No. 2013-029269 filed on Feb. 18, 2013. The entire disclosures of all of the above applications are incorporated herein by reference.

FIELD

The present invention relates to vehicular lighting apparatuses which control the illumination state of headlights of vehicles.

BACKGROUND

Conventionally, for vehicular lighting apparatuses, there has been known a technique of automatically shifting the beam state of a headlight according to the environmental conditions of the vehicle.

For example, in Patent Document 1, there is disclosed a vehicular lighting apparatus which sets the beam state of a headlight to a low-beam state during normal running of the vehicle, and shifts the beam state of the headlight from the low-beam state to a high-beam state when the vehicle-to-vehicle distance between the subject vehicle and a preceding vehicle running ahead of the subject vehicle becomes greater than or equal to a predetermined distance and the vehicle speed of the subject vehicle becomes greater than or equal to a predetermined vehicle speed.

Moreover, in recent years, there has been proposed a technique of running while keeping a predetermined vehicle-to-vehicle distance by adjusting the vehicle speed in accordance with a forward vehicle.

For example, in Patent Document 2, there is disclosed an auto-cruise apparatus which performs, in response to a predetermined manipulation of an inputting unit by the vehicle driver, automatic following by controlling the vehicle speed, with its upper limit set to a predetermined vehicle speed, so as to keep the vehicle-to-vehicle distance between a forward vehicle and the subject vehicle at a predetermined vehicle-to-vehicle distance.

Moreover, to improve the visibility of a vehicle by the surroundings, there has been provided a technique of DRL (Daytime Running Lamps), according to which the vehicle runs in daytime with the headlights of the vehicle turned on.

For example, in Patent Document 3, there is disclosed a vehicular lighting apparatus which sets a second lighting device to a daytime-on state based on both an on state of a headlight, which is capable of illuminating the advancing direction of the vehicle, and the operational position of an ignition switch of the vehicle.

PATENT DOCUMENT 1 Japanese Patent Application Publication No. JPS62253544A

PATENT DOCUMENT 2 Japanese Patent Application Publication No. JP 2002178786A

PATENT DOCUMENT 3 Japanese Patent Application Publication No. JP2005199794 A

However, with the above technique described in Patent Documents 1 and 2, though the beam state of the headlight is set to the low-beam state during normal running of the vehicle, there is still a possibility that the headlight dazzles occupants of forward vehicles, which include oncoming vehicles and preceding vehicles, when the vehicle is following a preceding vehicle or the vehicle-to-vehicle distance between the vehicle and a preceding vehicle is short.

Moreover, with the above technique described in Patent Documents 2 and 3, daytime running lighting is performed for improving the visibility of a vehicle by the surroundings in daytime. However, when the vehicle is following a preceding vehicle or the vehicle-to-vehicle distance between the vehicle and a preceding vehicle is short, it is easy for the visibility of the vehicle by the surroundings to be improved due to the presence of the preceding vehicle. Consequently, the daytime running lighting may become unnecessary.

However, in such a vehicle where daytime running lighting is available, the daytime running lamps are turned on at the same time as start of the engine, and in many cases the daytime running lamps cannot be turned off during operation. Consequently, electric power is continuously supplied from a battery even when the daytime running lighting is unnecessary, causing a problem of excessively consuming the battery power.

The present invention has been made in view of the above-described problems and aims to provide a vehicular lighting apparatus which can lower the degree of dazzling an occupant of a forward vehicle and the battery load of the subject vehicle.

SUMMARY

According to the invention, which has been made for solving the above-described problems, a vehicular lighting apparatus is provided. The vehicular lighting apparatus includes: a headlight for illuminating an outside of a subject vehicle; a vehicle-to-vehicle distance detecting unit configured to detect a vehicle-to-vehicle distance between the subject vehicle and a forward vehicle present in front of the subject vehicle; a following-state determining unit configured to determine whether the subject vehicle is in an automatic following state with respect to the forward vehicle; a vehicle-to-vehicle distance determining unit configured to determine whether the vehicle-to-vehicle distance detected by the vehicle-to-vehicle distance detecting unit is less than a predetermined vehicle-to-vehicle distance; and an illumination controlling unit configured to control an illumination state of the headlight. The vehicular lighting apparatus operates by having the illumination controlling unit change the illumination state of the headlight when the subject vehicle is determined by the following-state determining unit as being in the automatic following state or the vehicle-to-vehicle distance detected by the vehicle-to-vehicle distance detecting unit is determined by the vehicle-to-vehicle distance determining unit as being less than the predetermined vehicle-to-vehicle distance.

With the above configuration, the illumination controlling unit changes the illumination state of the headlight when the subject vehicle is following the forward vehicle or the vehicle-to-vehicle distance between the subject vehicle and the forward vehicle is less than the predetermined vehicle-to-vehicle distance. Consequently, it is possible to automatically lower the degree of dazzling an occupant of the forward vehicle and the battery load of the subject vehicle in daytime without performing a shifting process of the headlight by the driver.

DESCRIPTION

Hereinafter, embodiments that embody a vehicular lighting apparatus according to the present disclosure will be described with reference to the drawings. Moreover, in the following embodiments, the term "a forward vehicle" encompasses not only a preceding vehicle but also an oncoming vehicle with respect to a subject vehicle.

First, referring to FIG. 1, the configuration of a vehicular lighting apparatus 1 according to a first embodiment will be described. Here, FIG. 1 is a block diagram of the vehicular lighting apparatus 1 according to the present embodiment.

Figure 1:
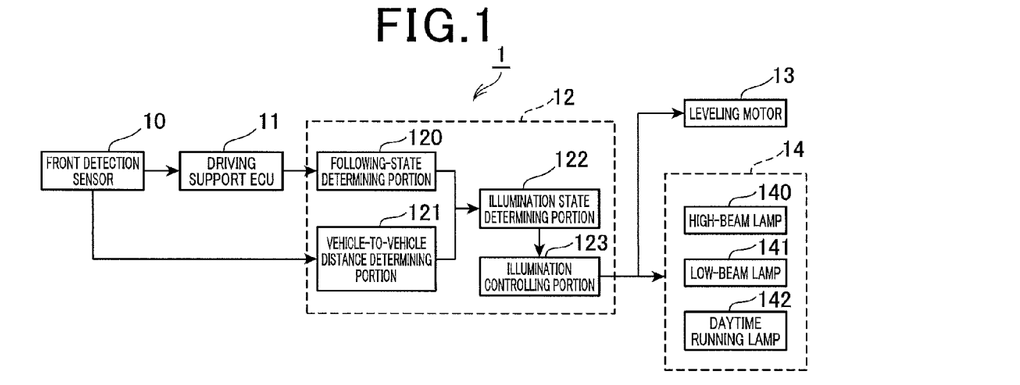
FIG. 1 is a functional block diagram illustrating the overall configuration of a vehicular lighting apparatus 1 according to a first embodiment.

As shown in FIG. 1, the vehicular lighting apparatus 1 includes a front detection sensor 10 (a forward vehicle detecting unit, a vehicle-to-vehicle distance detecting unit), a driving support ECU 11, a headlight ECU 12, a leveling motor 13 and a headlight 14.

The front detection sensor 10 is arranged in the front of the vehicle and monitors the surroundings in front of the subject vehicle. The front detection sensor 10 detects a forward vehicle present in front of the subject vehicle and further detects the vehicle-to-vehicle distance between the subject vehicle and the forward vehicle. The front detection sensor 10 is connected with the driving support ECU 11 and the headlight ECU 12 and outputs a vehicle-to-vehicle distance signal, which is indicative of the detected vehicle-to-vehicle distance, to the driving support ECU 11 and the headlight ECU 12. The front detection sensor 10 may be implemented by a millimeter wave radar sensor, a laser radar sensor, an ultrasonic sensor or an image sensor. Those sensors may also be used in combination to detect the vehicle-to-vehicle distance.

The driving support ECU 11 is an electronic control unit which controls accelerating and decelerating devices, such as a brake and a throttle none of which are shown in the figures. The driving support ECU 11 is configured to receive the vehicle-to-vehicle distance signal outputted from the front detection sensor 10. The driving support ECU 11 has an automatic following function and activates the automatic following function upon receiving a following-request signal from a following-request switch which is operable by a user and not shown in the figures. The driving support ECU 11 performs a process of controlling the automatic following of the subject vehicle to a preceding vehicle based on the vehicle-to-vehicle distance detected by the front detection sensor 10. The driving support ECU 11 is connected with the headlight ECU 12 and outputs a following-state signal to the headlight ECU 12; the following-state signal indicates whether the subject vehicle is in an automatic following state with respect to the forward vehicle.

The headlight ECU 12 is an electronic control unit which performs an illumination control based on an amount of pitch and a steering angle of a steering wheel; the amount of pitch and the steering angle are respectively detected by a height sensor and a steering sensor both of which are not shown in the figures. In the present embodiment, the headlight ECU 12 executes a process of controlling the illumination state of the headlight 14. The headlight ECU 12 is functionally comprised of a following-state determining portion 120 (a following-state determining unit), a vehicle-to-vehicle distance determining portion 121 (a vehicle-to-vehicle distance determining unit), an illumination state determining portion 122 and an illumination controlling portion 123 (an illumination controlling unit); those portions are configured with software and a micro processor (not shown in the figures).

The following-state determining portion 120 receives the following-state signal outputted from the driving support ECU 11 and determines whether the received following-state signal is an on signal. The following-state determining portion 120 is connected with the illumination state determining portion 122 and outputs the determination result to the illumination state determining portion 122.

The vehicle-to-vehicle distance determining portion 121 receives the vehicle-to-vehicle distance signal outputted from the front detection sensor 10. Then, based on the received vehicle-to-vehicle distance signal, the vehicle-to-vehicle distance determining portion 121 determines whether the vehicle-to-vehicle distance detected by the front detection sensor 10 is less than a predetermined vehicle-to-vehicle distance. The vehicle-to-vehicle distance determining portion 121 is connected with the illumination state determining portion 122 and outputs the determination result to the illumination state determining portion 122.

The illumination state determining portion 122 receives the follow-up determination result outputted from the following-state determining portion 120 and the vehicle-to-vehicle distance determination result outputted from the vehicle-to-vehicle distance determining portion 121. Then, based on the received determination results, the illumination state determining portion 122 determines the illumination state of the headlight 14. The illumination state determining portion 122 is connected with the illumination controlling portion 123 and outputs the illumination state determination result to the illumination controlling portion 123.

The illumination controlling portion 123 receives the illumination state determination result outputted from the illumination state determining portion 122. Then, based on the received illumination state determination result, the illumination controlling portion 123 controls both the leveling motor 13 and the headlight 14. The illumination controlling portion 123 is connected with both the leveling motor 13 and the headlight 14 and outputs an angle correction command signal to the leveling motor 13 and an illumination control signal to the headlight 14. In addition, the illumination control of the headlight 14 herein refers to changing the on, off, illumination range, etc. of the headlight 14.

The leveling motor 13 is a motor that corrects the optical axis angle of the headlight 14 in the vertical direction of the vehicle. The leveling motor 13 receives the angle correction command signal outputted from the illumination controlling portion 123. Then, in accordance with the received angle correction command signal, the leveling motor 13 corrects the optical axis angle of the headlight 14 forward or downward.

The headlight 14 is a device which illuminates the outside of the subject vehicle. The headlight 14 receives the illumination control signal outputted from the illumination controlling portion 123. Then, in accordance with the received illumination control signal, the headlight 14 changes the illumination state. The headlight 14 is comprised of a high-beam lamp 140, a low-beam lamp 141 and a daytime running lamp 142. The high-beam lamp 140 is a lamp which illuminates upward a long range ahead of the subject vehicle. The low-beam lamp 141 is a lamp which illuminates a predetermined angle-downward a short range ahead of the subject vehicle. The daytime running lamp 142 is a lamp which illuminates in daytime.

Next, operation of the vehicular lighting apparatus 1 will be described with reference to FIG. 1.

First, the front detection sensor 10 detects the vehicle-to-vehicle distance between the subject vehicle and the forward vehicle and outputs the vehicle-to-vehicle distance signal, which indicates the detected vehicle-to-vehicle distance, to both the driving support ECU 11 and the headlight ECU 12. Based on the received vehicle-to-vehicle distance signal, the driving support ECU 11 performs the automatic following by controlling the accelerating and decelerating devices (not-shown) and outputs the following-state signal to the headlight ECU 12. The headlight ECU 12 controls the leveling motor 13 and the headlight 14 based on both the vehicle-to-vehicle distance signal received from the front detection sensor 10 and the following-state signal received from the driving support ECU 11. Further, under the control by the headlight ECU 12, the headlight 14 changes the illumination state.

Figure 2:
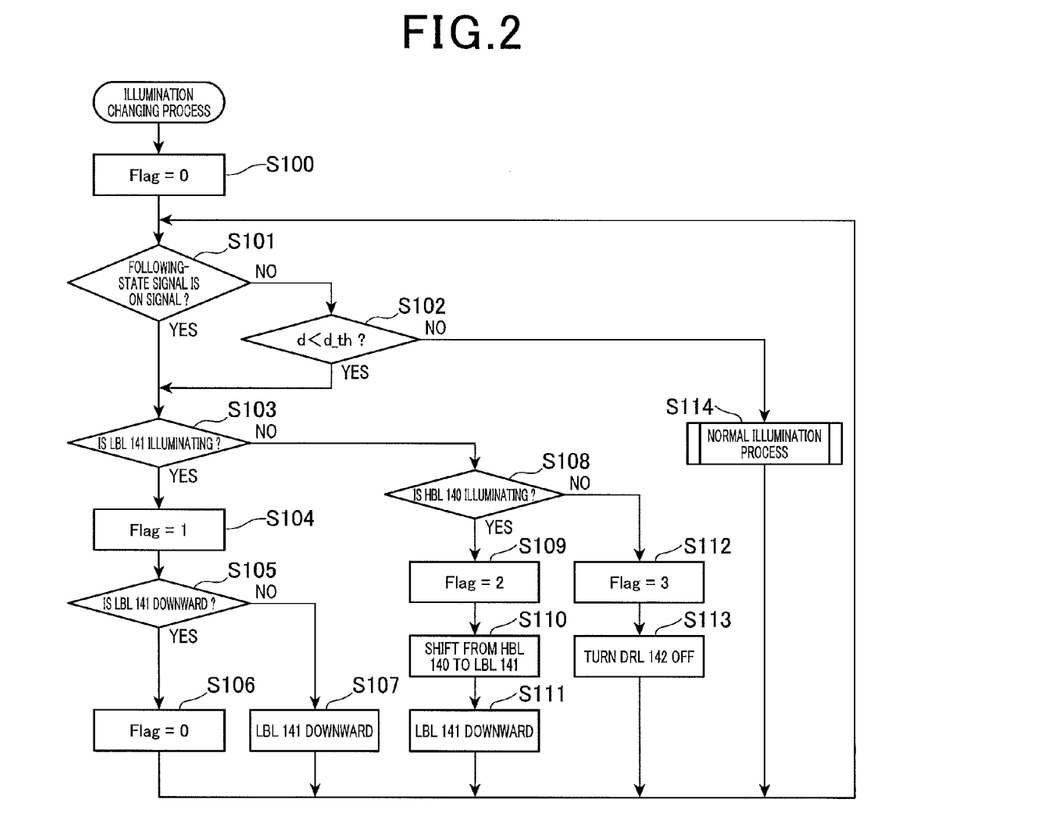
FIG. 2 is a flow chart illustrating the outline of an illumination changing process by the vehicular lighting apparatus 1 according to the first embodiment.
Figure 3:
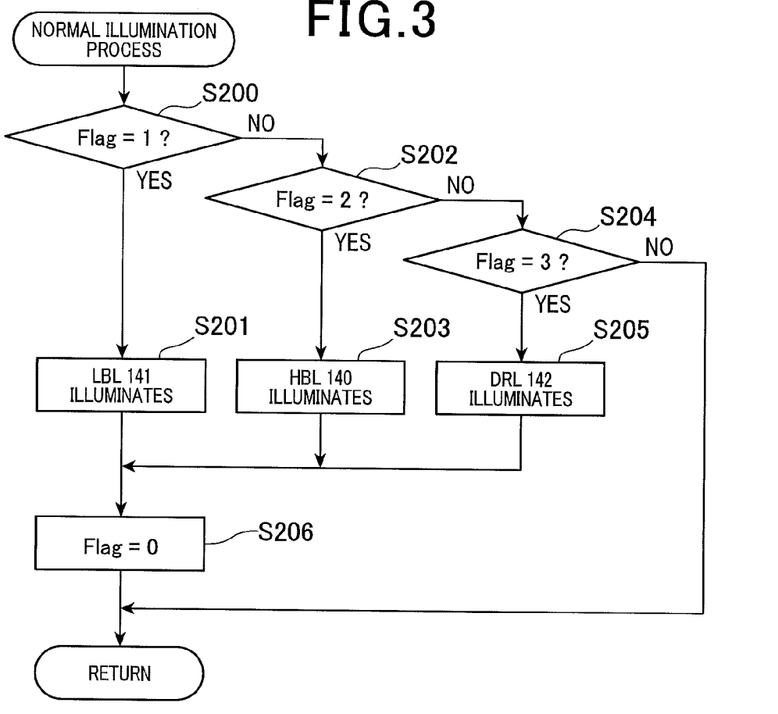
FIG. 3 is a flow chart illustrating the details of a normal illumination process included in FIG. 2.

FIG. 2 is a flow chart illustrating the outline of an illumination changing process by the vehicular lighting apparatus 1. In FIG. 2, the high-beam lamp 140 is denoted by HBL 140; the low-beam lamp 141 is denoted by LBL 141; the daytime running lamp 142 is denoted by DRL 142. Moreover, FIG. 3 is a flow chart illustrating the details of a normal illumination process included in the illumination changing process of FIG. 2.

The illumination changing process will be described with reference to FIG. 2.

First, at S100, a flag is cleared (Flag=0). At S101, the following-state determining portion 120 of the headlight ECU 12 determines whether the following-state signal received from the driving support ECU 11 is an on signal or not.

Here, the following-state signal being an on signal indicates that the subject vehicle is in the automatic following state with respect to the forward vehicle. In contrast, the follow-signal being an off signal indicates that the subject vehicle is not in the automatic following state with respect to the forward vehicle.

If the following-state signal is determined at S101 as being an off signal (S101: No), the vehicle-to-vehicle distance determining portion 121 determines whether the vehicle-to-vehicle distance d between the forward vehicle and the subject vehicle detected by the front detection sensor 10 is less than the predetermined vehicle-to-vehicle distance d_th (S102). Here, the predetermined vehicle-to-vehicle distance d_th is previously set to a value representing a short distance (for example, 7-8 m).

If the detected vehicle-to-vehicle distance d is determined at S102 as being greater than or equal to the predetermined vehicle-to-vehicle distance d_th (S102: No), the illumination changing process proceeds to the normal illumination process at S114.

On the other hand, if the following-state signal is determined at S101 as being an on signal (S101: Yes) or if the detected vehicle-to-vehicle distance d is determined at S102 as being less than the predetermined vehicle-to-vehicle distance d_th (S102: Yes), the illumination state determining portion 122, which has received the follow-up determination result or the vehicle-to-vehicle distance determination result, determines whether the low-beam lamp 141 is illuminating the outside of the subject vehicle (S103).

If the low-beam lamp 141 is determined at S103 as being illuminating the outside of the subject vehicle (S103: Yes), the flag is set to 1 (Flag=1) (S104). Then, the illumination state determining portion 122 further determines whether the low-beam lamp 141 is more downward than normal (S105).

In the present embodiment, the expression "the low-beam lamp 141 is more downward than normal" unit that the optical axis angle of the low-beam lamp 141 in the vertical direction of the vehicle is less than a predetermined optical axis angle. Here, the predetermined optical axis angle is previously set to the optical axis angle of the low-beam lamp 141 in the vertical direction of the vehicle when the low-beam lamp 141 illuminates normally-downward. Accordingly, when the optical axis angle of the low-beam lamp 141 in the vertical direction of the vehicle is less than the predetermined optical axis angle, the low-beam lamp 141 is determined as being more downward than normal.

If the low-beam lamp 141 is determined at S105 as being more downward than normal (S105: Yes), the flag is cleared (Flag=0) (S106). Then, the process returns to S101.

On the other hand, if the low-beam lamp 141 is determined at S105 as being not more downward than normal (S105: No), the illumination controlling portion 123, which has received the illumination state determination result, outputs the angle correction command signal to the leveling motor 13. Then, in accordance with the received angle correction command signal, the leveling motor 13 corrects the optical axis angle of the low-beam lamp 141 in the vertical direction of the vehicle so as to be less than the predetermined optical axis angle, thereby adjusting the low-beam lamp 141 more downward than normal (S107). Thereafter, the process returns to S101.

Moreover, if the low-beam lamp 141 is determined at S103 as being not illuminating the outside of the vehicle (S103: No), the illumination state determining portion 122 further determines whether the high-beam lamp 140 is illuminating the outside of the vehicle (S108).

If the high-beam lamp 140 is determined at S108 as being illuminating the outside of the vehicle (S108: Yes), the flag is set to 2 (Flag=2) (S109). Then, the illumination controlling portion 123, which has received the illumination state determination result, outputs the illumination control signal to the headlight 14. In accordance with the received illumination control signal, the headlight 14 turns the high-beam lamp 140 off and the low-beam lamp 141 on, thereby shifting the illumination state from the high-beam lamp 140 to the low-beam lamp 141 (S110).

Further, the leveling motor 13, which has received the angle correction command signal from the illumination controlling portion 123, corrects the optical axis angle of the low-beam lamp 141 in the vertical direction of the vehicle so as to be less than the predetermined optical axis angle, thereby adjusting the low-beam lamp 141 more downward than normal (S111). Thereafter, the process returns to S101.

On the other hand, if the high-beam lamp 140 is determined at S108 as being not illuminating the outside of the vehicle (S108: No), the illumination state determining portion 122 determines that the daytime running lamp 142 is illuminating. Further, the flag is set to 3 (Flag=3) (S112). Then, the illumination controlling portion 123, which has received the illumination state determination result, outputs the illumination control signal to the headlight 14. In accordance with the received illumination control signal, the headlight 14 turns the daytime running lamp 142 off (S113). Thereafter, the process returns to S101.

Next, the normal illumination process at S114 will be descried with reference to FIG. 3. The normal illumination process is performed by the headlight 14 when the following-state signal is determined as being an off signal and the vehicle-to-vehicle distance d detected by the front detection sensor 10 is determined as being greater than or equal to the predetermined vehicle-to-vehicle distance d_th, in other words, when the normal illumination is necessary.

In the normal illumination process, first, it is determined whether or not the flag is set to 1 (Flag=1 or not) (S200). Here, the flag being set to 1 indicates that the low-beam lamp 141 was illuminating the outside of the vehicle before the change in the illumination state. If the flag is determined at S200 as being set to 1 (S200: Yes), the low-beam lamp 141 is selected to illuminate the outside of the vehicle (S201). Then, the process proceeds to S206.

On the other hand, if the flag is determined at S200 as being not set to 1 (S200: No), it is further determined whether or not the flag is set to 2 (Flag=2 or not) (S202). Here, the flag being set to 2 indicates that the high-beam lamp 140 was illuminating the outside of the vehicle before the change in the illumination state. If the flag is determined at S202 as being set to 2 (S202: Yes), the high-beam lamp 140 is selected to illuminate the outside of the vehicle (S203). Then, the process proceeds to S206.

On the other hand, if the flag is determined at S202 as being not set to 2 (S202: No), it is further determined whether or not the flag is set to 3 (Flag=3 or not) (S204).

Here, the flag being set to 3 indicates that the daytime running lamp 142 was illuminating the outside of the vehicle before the change in the illumination state. Moreover, the flag being not set to 3 indicates that the flag is set to 0 and the illumination state of the headlight 14 has been not changed. If the flag is determined at S204 as being set to 3 (S204: Yes), the daytime running lamp 142 is selected to illuminate the outside of the vehicle (S205). Then, the process proceeds to S206.

At S206, the flag is cleared (Flag=0). Then, the normal illumination process returns to the illumination changing process, and the illumination changing process returns to S101. Moreover, if the flag is determined at S204 as being not set to 3 (S204: No), the normal illumination process directly returns to the illumination changing process, and the illumination changing process returns to S101.

Figure 4:
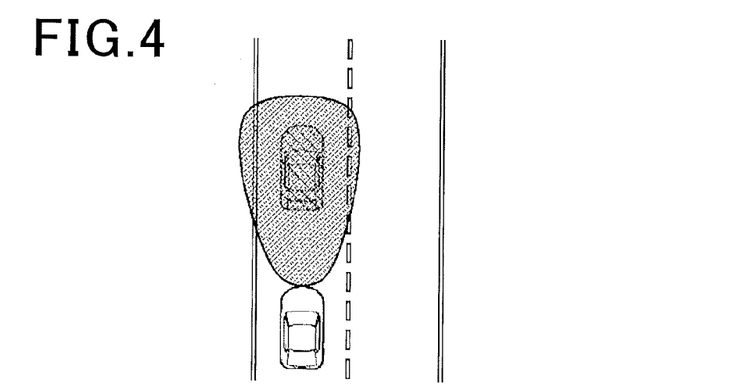
FIG. 4 is a schematic view from the top side illustrating an illumination state of a headlight 14 (a normal illumination state of a high-beam lamp 140 or a low-beam lamp 141) before a change in the first embodiment, a second modification and a third modification.
Figure 5:
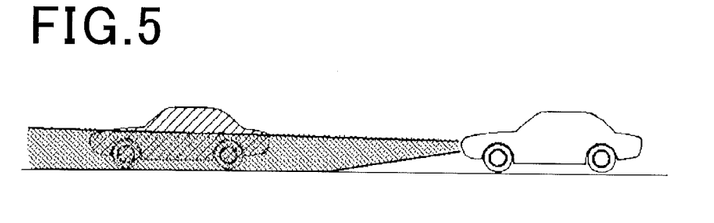
FIG. 5 is a schematic view from a lateral side illustrating the illumination state of the headlight 14 (the normal illumination state of the high-beam lamp 140 or the low-beam lamp 141) before the change in the first embodiment, the second modification and the third modification.
Figure 6:
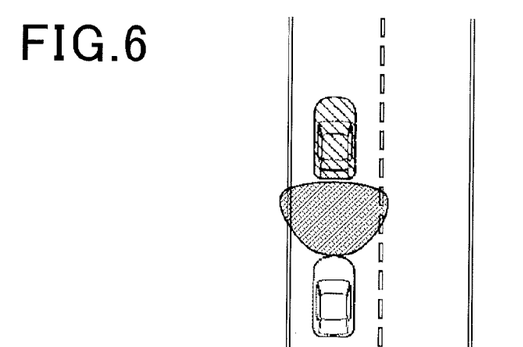
FIG. 6 is a schematic view from the top side illustrating an illumination state of the headlight 14 (an illumination state where the low-beam lamp 141 is more downward than normal) after the change in the first embodiment.
Figure 7:
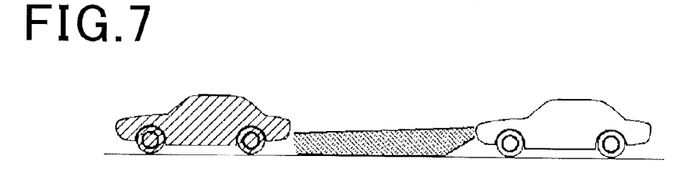
FIG. 7 is a schematic view from a lateral side illustrating the illumination state of the headlight 14 (the illumination state where the low-beam lamp 141 is more downward than normal) after the change in the first embodiment.

Finally, advantageous effects of the present embodiment will be described. According to the present embodiment, when the subject vehicle is in the automatic following state with respect to the forward vehicle or the vehicle-to-vehicle distance between the subject vehicle and the forward vehicle is short, the vehicular lighting apparatus 1 changes, if the high-beam lamp 140 or the low-beam lamp 141 is illuminating the outside of the vehicle, the illumination state such that the low-beam lamp 141 illuminates the outside of the vehicle more downward than normal. Consequently, from the illumination target position of the high-beam lamp 140 or the low-beam lamp 141 before the change in the illumination state as shown in FIGS. 4 and 5, the illumination target position of the low-beam lamp 141 after the change in the illumination state as shown in FIGS. 6 and 7 is shifted toward the near side of the subject vehicle. As a result, it becomes possible to lower the degree of dazzling an occupant of the forward vehicle in comparison with the normal illumination state of the low-beam lamp 141.

Figure 8:
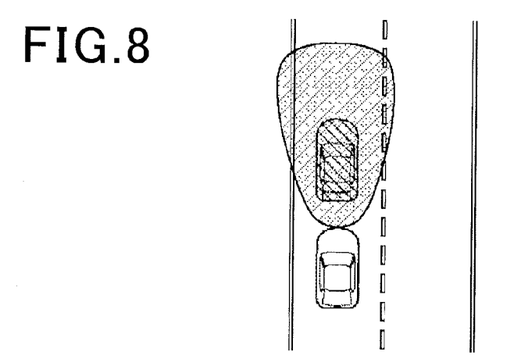
FIG. 8 is a schematic view from the top side illustrating an illumination state of the headlight 14 (a normal illumination state of a daytime running lamp 142) before a change in the first embodiment.
Figure 9:
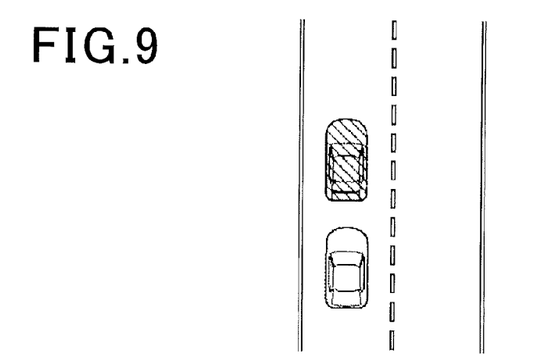
FIG. 9 is a schematic view from the top side illustrating an illumination state of the headlight 14 (an off state of the daytime running lamp 142) after the change in the first embodiment.

Moreover, if the daytime running lamp 142 is illuminating the outside of the vehicle as shown in FIG. 8 when the subject vehicle is in the automatic following state with respect to the forward vehicle or the vehicle-to-vehicle distance between the subject vehicle and the forward vehicle is short, the vehicular lighting apparatus 1 turns the daytime running lamp 142 off as shown in FIG. 9. This is because due to the presence of the forward vehicle at a short distance from the subject vehicle, it becomes easy for the visibility of the subject vehicle by the surroundings to be improved and thus it becomes less necessary for the daytime running light 142 to illuminate the outside of the vehicle. Accordingly, by turning the daytime running lamp 142 off, it is possible to lower the battery load of the subject vehicle.

Furthermore, when the subject vehicle is not in the automatic following state with respect to the forward vehicle and the vehicle-to-vehicle distance between the subject vehicle and the forward vehicle is long, in other words, when the normal illumination is necessary, the vehicular lighting apparatus 1 automatically returns the headlight 14 to the illumination state before the change. For example, when the vehicle-to-vehicle distance between the subject vehicle and the forward vehicle becomes short during illumination of the outside of the vehicle by the daytime running lamp 142 in daytime, the vehicular lighting apparatus 1 will turn the daytime running lamp 142 off. Thereafter, when the vehicle-to-vehicle distance between the subject vehicle and the forward vehicle becomes long, in other words, when the forward vehicle is no longer present at a short distance from the subject vehicle, it again becomes necessary to improve the visibility of the subject vehicle by the surroundings. Accordingly, the vehicular lighting apparatus 1 will resume the illumination of the outside of the vehicle by the daytime running lamp 142.

In addition, the present invention is not limited to the above-described embodiment and can be modified in various ways without departing from the spirit of the invention.

First Modification

In the previous embodiment, the degree of dazzling the occupant of the forward vehicle is lowered by adjusting the low-beam lamp 141 to illuminate more downward than normal and thus shifting the illumination target position of the low-beam lamp 141 toward the near side of the subject vehicle. However, the degree of dazzling the occupant of the forward vehicle can be lowered by other methods, for example by reducing the illumination area of the headlight 14 on the forward vehicle.

As an example of reducing the illumination area on the forward vehicle, it is possible to configure the headlight 14 to be capable of illuminating the outside of the vehicle while shading a range within which the occupant of the forward vehicle is present.

Specifically, it is possible to configure the headlight 14 using a DMD (Digital Micromirror Device). The DMD is a kind of MEMS (Micro Electro Mechanical System) which includes a light source and a number of micro mirrors that project light by reflecting the light of the light source. The DMD changes angles of the micro mirrors individually by means of electrostatic attraction, thereby achieving a desired light distribution.

Figure 10:
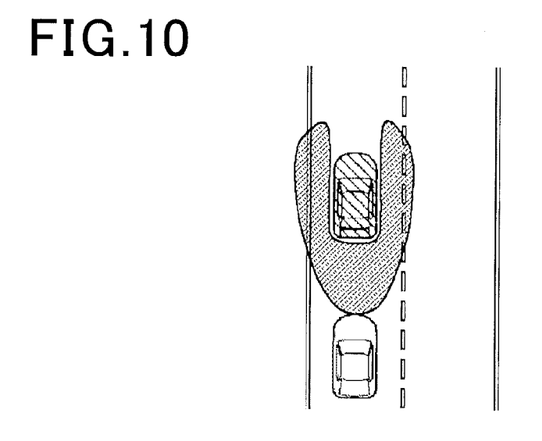
FIG. 10 is a schematic view from the top side illustrating an illumination state of the headlight 14 (a shaded illumination state of the low-beam lamp 141) after the change in the first modification.

Specifically, if the high-beam lamp 140 or the low-beam lamp 141 is illuminating the outside of the vehicle when the subject vehicle is in the automatic following state with respect to the forward vehicle or the vehicle-to-vehicle distance between the subject vehicle and the forward vehicle is short, the vehicular lighting apparatus 1 determines, based on the detection of the forward vehicle by the front detection sensor 10, the range within which the occupant of the forward vehicle is present. Then, in accordance with the illumination control signal, the headlight 14 changes the illumination state such that the low-beam lamp 14 illuminates the outside of the vehicle with the above range shaded. Consequently, as shown in FIG. 10, the headlight 14 comes to illuminate a lower part of the rear of the forward vehicle without illuminating an upper part of the rear of the forward vehicle, i.e., without illuminating the range within which the occupant of the forward vehicle is present. As a result, it becomes possible to lower the degree of dazzling the occupant of the forward vehicle while making the field of view in front of the subject vehicle clearer.

Second Modification

Moreover, it is also possible to lower the degree of dazzling the occupant of the forward vehicle by making a cut line, which represents the boundary between the illumination range and the non-illumination range of the headlight 14, sharp.

Figure 11:
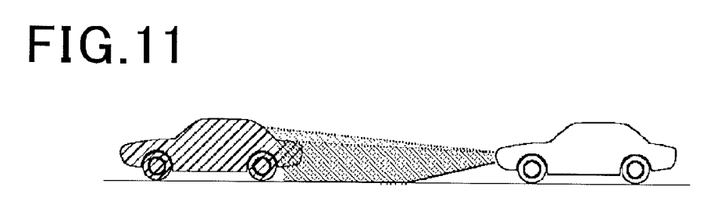
FIG. 11 is a schematic view from a lateral side illustrating an illumination state of the headlight 14 before a change in the second modification.
Figure 12:
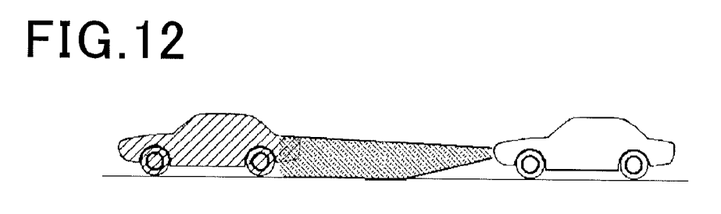
FIG. 12 is a schematic view from a lateral side illustrating an illumination state of the headlight 14 (a cut line-changed illumination state of the low-beam lamp 141) after the change in the second modification.

Specifically, if the high-beam lamp 140 or the low-beam lamp 141 is illuminating the outside of the vehicle when the subject vehicle is in the automatic following state with respect to the forward vehicle or the vehicle-to-vehicle distance between the subject vehicle and the forward vehicle is short, the headlight 14 adjusts, in accordance with the illumination control signal, the distance between the light source of the headlight 14 and a light shield in the illumination state of the low-beam lamp 141, thereby locating the light shield at the focal point of the light source. Consequently, it becomes possible to make the cut line, which was blurry as shown in FIG. 11 before the change in the illumination state, sharp as shown in FIG. 12 after the change in the illumination state. With the cut line made sharp, for example, when the headlight 14 illuminates a lower part of the rear of the forward vehicle and the road surface, it becomes difficult for a rear glass in an upper part of the rear of the forward vehicle to be illuminated. As a result, it becomes possible to prevent reflection by the glass which is susceptible to illumination, thereby lowering the degree of dazzling the occupant of the forward vehicle.

Third Modification

Moreover, in the previous embodiment, when it is less necessary to illuminate the outside of the vehicle in daytime, the daytime running lamp 142 is turned off, thereby lowering the battery load of the subject vehicle. However, it is also possible to dim the light emitted by the headlight 14, thereby reducing the electric power consumption by the headlight 14 and thus lowering the battery load of the subject vehicle.

As an example of dimming the light emitted by the headlight 14, it is possible to configure the headlight 14 to be capable of changing the illumination color of the daytime running lamp 142. Specifically, an LED may be employed as the headlight 14 capable of changing the illumination color. In this case, if the daytime running lamp 142 is illuminating the outside of the vehicle when the subject vehicle is in the automatic following state with respect to the forward vehicle or the vehicle-to-vehicle distance between the subject vehicle and the forward vehicle is short, the headlight 14 changes, in accordance with the illumination control signal, the illumination color of the daytime running lamp 142 to a color consuming less electric power or a color less dazzling to the occupant of the forward vehicle (e.g., red)

Figure 13:
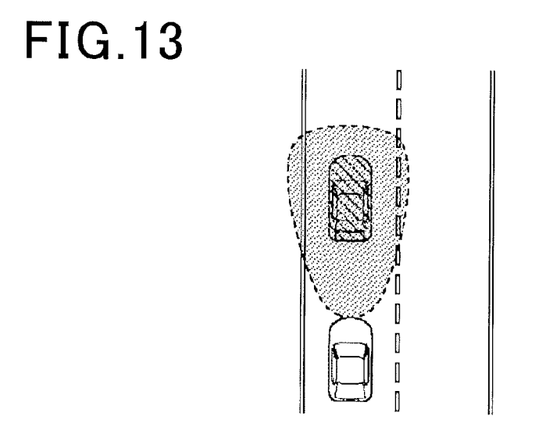
FIG. 13 is a schematic view from the top side illustrating an illumination state of the headlight 14 (a dimmed illumination state of the low-beam lamp 141 or the daytime running lamp 142).

Moreover, it is possible to configure the headlight 14 to be capable of changing the illumination intensity and dim the light emitted by the headlight 14 by lowering the illumination intensity. Alternatively, it is also possible to dim the light emitted by the headlight 14 by reducing the number of illuminating lamps of the headlight 14. In any of the above-described cases, it is possible to dim the light emitted by the headlight 14 as shown in FIG. 13, thereby reducing the electric power consumption by the headlight 14 and thus lowering the battery load of the subject vehicle. In addition, by employing an LED consuming less electric power as the headlight 14 capable of changing the illumination color or the illumination intensity, it is possible to further lower the battery load of the subject vehicle.

Furthermore, when the high-beam lamp 140 or the low-beam lamp 141 is illuminating the outside of the vehicle, it is also possible to dim the light emitted by the headlight 14 as shown in FIG. 13 by at least one of changing the illumination color, lowering the illumination intensity and reducing the number of illuminating lamps. Consequently, it is possible lower the battery load of the subject vehicle and the degree of dazzling the occupant of the forward vehicle.

In addition, in any of the above-described modifications, it is possible to achieve the same advantageous effects as in the previous embodiment.

Moreover, the daytime running lamp 142 of the headlight 14 in the present invention can be implemented by any lamp capable of illuminating in daytime, such as a dedicated external lamp, a dimmed high-beam lamp or a low-beam lamp.

The invention claimed is:

1. A vehicular lighting apparatus comprising:
a headlight illuminating an outside of a subject vehicle;
a vehicle-to-vehicle distance detecting unit detecting a vehicle-to-vehicle distance between the subject vehicle and a forward vehicle present in front of the subject vehicle;
a following-state determining unit determining whether the subject vehicle is in an automatic following state with respect to the forward vehicle;
a vehicle-to-vehicle distance determining unit determining whether the vehicle-to-vehicle distance detected by the vehicle-to-vehicle distance detecting unit is less than a predetermined vehicle-to-vehicle distance; and
an illumination controlling unit automatically controlling an illumination state of the headlight,
wherein
the illumination controlling unit automatically changes the illumination state of the headlight when the subject vehicle is determined by the following-state determining unit as being in the automatic following state or the vehicle-to-vehicle distance detected by the vehicle-to-vehicle distance detecting unit is determined by the vehicle-to-vehicle distance determining unit as being less than the predetermined vehicle-to-vehicle distance,
wherein
the illumination controlling unit automatically changes the illumination state of the headlight from one of a high-beam state where the headlight illuminates upward, a low-beam state where the headlight illuminates normally-downward and a daytime running lighting state where the headlight illuminates in daytime,
wherein
the illumination controlling unit automatically changes the illumination state of the headlight to a less-dazzling state where a degree of dazzling an occupant of the forward vehicle is lower than in the low-beam state or to a less-power consumption state where the headlight consumes less electric power than in the daytime running lighting state, and
wherein
the low-beam state is a state where an optical axis angle of the headlight in a vertical direction of the vehicle is downward by a predetermined angle; and
the illumination controlling unit automatically changes the illumination state of the headlight to the less-dazzling state by tilting the optical axis angle of the headlight more downward than the predetermined angle of the low-beam state.

2. The vehicular lighting apparatus as set forth in claim 1, further comprising a forward vehicle detecting unit detecting the forward vehicle, wherein the illumination controlling unit automatically changes the illumination state of the headlight when the forward vehicle is detected by the forward vehicle detecting unit and the vehicle-to-vehicle distance detected by the vehicle-to-vehicle distance detecting unit is determined by the vehicle-to-vehicle distance determining unit as being less than the predetermined vehicle-to-vehicle distance.

3. The vehicular lighting apparatus as set forth in claim 1, wherein the headlight is capable of changing an illumination color or an illumination intensity.

4. A vehicular lighting apparatus comprising:
a headlight illuminating an outside of a subject vehicle;
a vehicle-to-vehicle distance detecting unit detecting a vehicle-to-vehicle distance between the subject vehicle and a forward vehicle present in front of the subject vehicle;
a following-state determining unit determining whether the subject vehicle is in an automatic following state with respect to the forward vehicle;
a vehicle-to-vehicle distance determining unit determining whether the vehicle-to-vehicle distance detected by the vehicle-to-vehicle distance detecting unit is less than a predetermined vehicle-to-vehicle distance; and
an illumination controlling unit automatically controlling an illumination state of the headlight,
wherein
the illumination controlling unit automatically changes the illumination state of the headlight when the subject vehicle is determined by the following-state determining unit as being in the automatic following state or the vehicle-to-vehicle distance detected by the vehicle-to-vehicle distance detecting unit is determined by the vehicle-to-vehicle distance determining unit as being less than the predetermined vehicle-to-vehicle distance,
wherein
the illumination controlling unit automatically changes the illumination state of the headlight from one of a high-beam state where the headlight illuminates upward, a low-beam state where the headlight illuminates normally-downward and a daytime running lighting state where the headlight illuminates in daytime,
wherein
the illumination controlling unit automatically changes the illumination state of the headlight to a less-dazzling state where a degree of dazzling an occupant of the forward vehicle is lower than in the low-beam state or to a less-power consumption state where the headlight consumes less electric power than in the daytime running lighting state, and
wherein
the illumination controlling unit automatically changes the illumination state of the headlight from the daytime running lighting state to the less-power consumption state by turning the headlight off.

5. The vehicular lighting apparatus as set forth in claim 4, further comprising a forward vehicle detecting unit detecting the forward vehicle, wherein the illumination controlling unit automatically changes the illumination state of the headlight when the forward vehicle is detected by the forward vehicle detecting unit and the vehicle-to-vehicle distance detected by the vehicle-to-vehicle distance detecting unit is determined by the vehicle-to-vehicle distance determining unit as being less than the predetermined vehicle-to-vehicle distance.

6. The vehicular lighting apparatus as set forth in claim 4, wherein the headlight is capable of changing an illumination color or an illumination intensity.

7. A vehicular lighting apparatus comprising:
a headlight illuminating an outside of a subject vehicle;
a vehicle-to-vehicle distance detecting unit detecting a vehicle-to-vehicle distance between the subject vehicle and a forward vehicle present in front of the subject vehicle;
a following-state determining unit determining whether the subject vehicle is in an automatic following state with respect to the forward vehicle;
a vehicle-to-vehicle distance determining unit determining whether the vehicle-to-vehicle distance detected by the vehicle-to-vehicle distance detecting unit is less than a predetermined vehicle-to-vehicle distance; and
an illumination controlling unit automatically controlling an illumination state of the headlight, wherein
the illumination controlling unit automatically changes the illumination state of the headlight when the subject vehicle is determined by the following-state determining unit as being in the automatic following state or the vehicle-to-vehicle distance detected by the vehicle-to-vehicle distance detecting unit is determined by the vehicle-to-vehicle distance determining unit as being less than the predetermined vehicle-to-vehicle distance,
wherein
the illumination controlling unit automatically changes the illumination state of the headlight from one of a high-beam state where the headlight illuminates upward, a low-beam state where the headlight illuminates normally-downward and a daytime running lighting state where the headlight illuminates in daytime,
wherein
the illumination controlling unit automatically changes the illumination state of the headlight to a less-dazzling state where a degree of dazzling an occupant of the forward vehicle is lower than in the low-beam state or to a less-power consumption state where the headlight consumes less electric power than in the daytime running lighting state, and
wherein
the illumination controlling unit automatically changes the illumination state of the headlight by executing at least one of dimming light, changing color and changing illumination range of the headlight.

8. The vehicular lighting apparatus as set forth in claim 7, wherein the illumination controlling unit automatically dims the light of the headlight by lowering an illumination intensity of the headlight.

9. The vehicular lighting apparatus as set forth in claim 7, wherein the illumination controlling unit automatically dims the light of the headlight by reducing the number of illuminating lamps of the headlight.

10. The vehicular lighting apparatus as set forth in claim 7, wherein the illumination controlling unit automatically changes the illumination color of the headlight to a color consuming less electric power or a color less dazzling the occupant of the forward vehicle.

11. The vehicular lighting apparatus as set forth in claim 7, wherein the illumination controlling unit automatically changes the illumination range of the headlight by shifting an illumination target position of the headlight toward a near side of the subject vehicle.

12. The vehicular lighting apparatus as set forth in claim 7, wherein the illumination controlling unit automatically changes the illumination range of the headlight by reducing an illumination area of the headlight on the forward vehicle.

13. The vehicular lighting apparatus as set forth in claim 12, wherein the illumination controlling unit automatically reduces the illumination area of the headlight on the forward vehicle by shading a range within which the occupant of the forward vehicle is present.

14. The vehicular lighting apparatus as set forth in claim 7, wherein the illumination controlling unit automatically changes the illumination state of the headlight to the less-dazzling state by making a boundary between the illumination range and the non-illumination range of the headlight sharp.

15. The vehicular lighting apparatus as set forth in claim 7, further comprising a forward vehicle detecting unit detecting the forward vehicle, wherein the illumination controlling unit automatically changes the illumination state of the headlight when the forward vehicle is detected by the forward vehicle detecting unit and the vehicle-to-vehicle distance detected by the vehicle-to-vehicle distance detecting unit is determined by the vehicle-to-vehicle distance determining unit as being less than the predetermined vehicle-to-vehicle distance.

\* \* \* \* \*